J. T. LONG.
AIRSHIP.
APPLICATION FILED FEB. 16, 1911.
1,026,959.
Patented May 21, 1912.
4 SHEETS—SHEET 1.
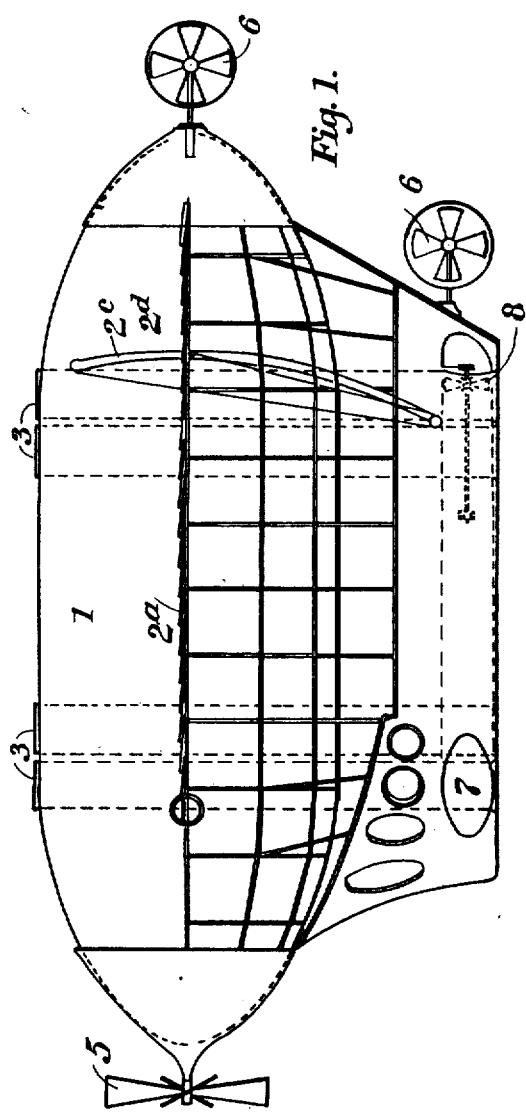
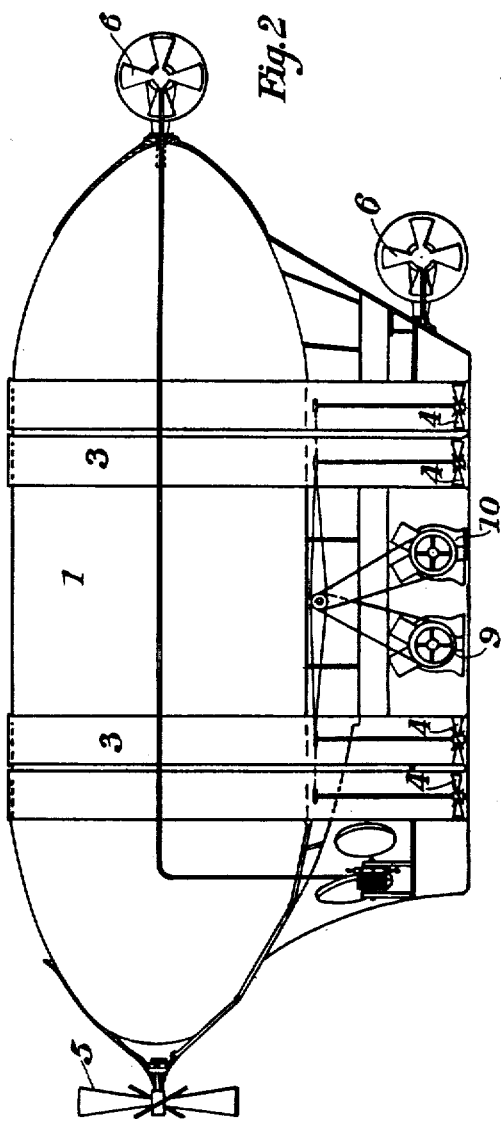
WITNESSES:
Elmer E. Rodabaugh,
John S. Siebert.
INVENTOR.
John T. Long
BY
A. B. Bowman
ATTORNEY.

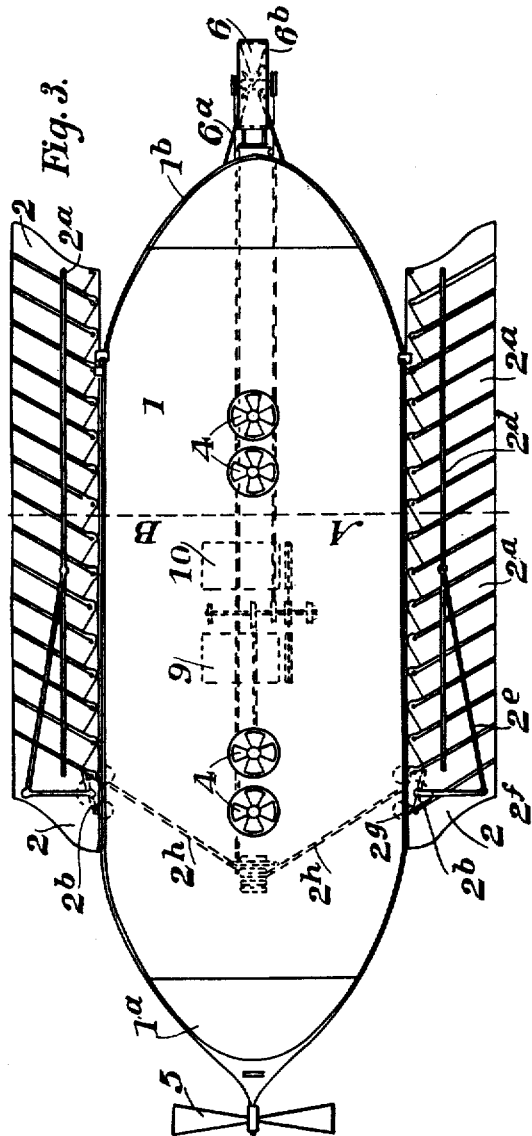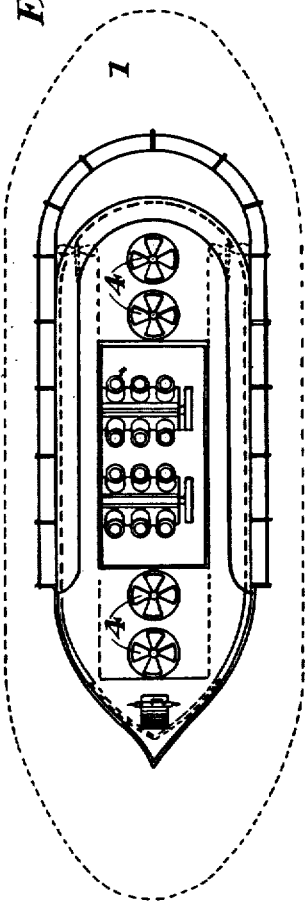

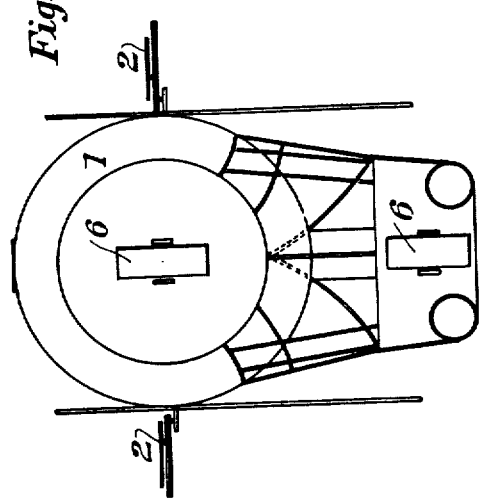
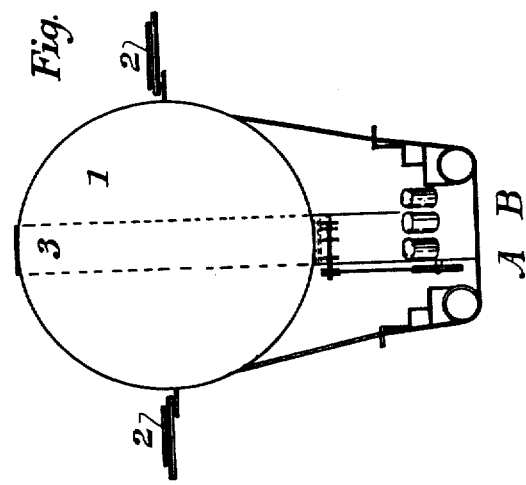
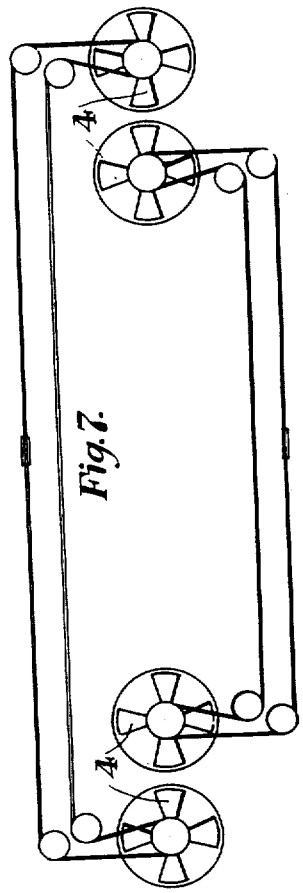

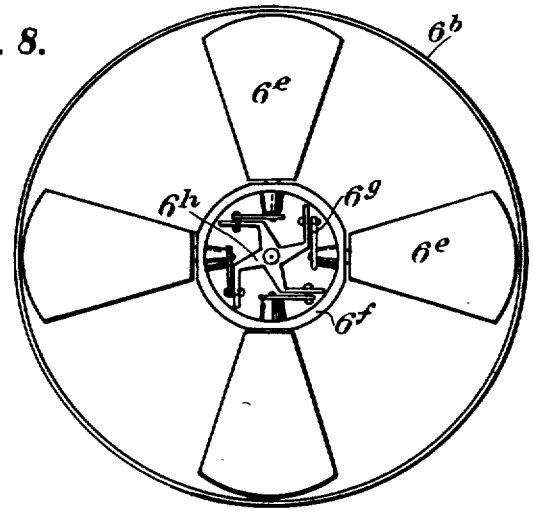
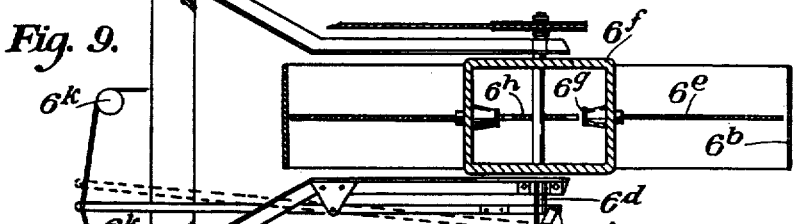
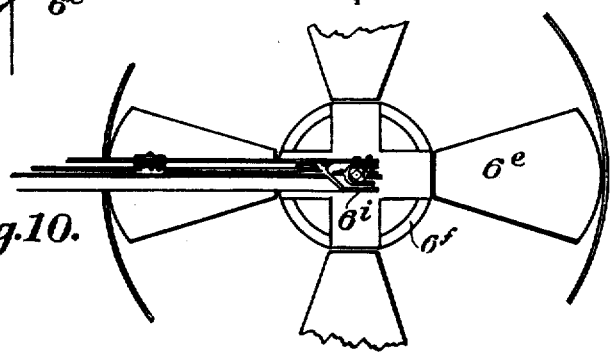

UNITED STATES PATENT OFFICE.

JOHN T. LONG, OF ENCANTO, CALIFORNIA.

AIRSHIP.

1,026,959.　　　　Specification of Letters Patent.　　Patented May 21, 1912.

Application filed February 16, 1911. Serial No. 609,031.

*To all whom it may concern:*

Be it known that I, JOHN T. LONG, a resident of Encanto, in the county of San Diego and State of California, have invented certain new and useful Improvements in Airships; and the following is a full, clear, and exact description thereof, so that those versed in the art to which it appertains may make and use the same.

My invention relates to airships in which are combined certain elements of the dirigible balloon, aeroplane, and helicopter types, and the objects are, first, to provide an airship which has a sufficient gas sustaining force to overcome its own weight and still not be cumbersome to manage in the air, second, to provide such an airship with planes adapted for balancing it and for raising and lowering it when in flight, third, to provide a further means for raising, lowering and propelling the same in the form of helicopters operated singly or in tandem, in large tubes which extend vertically and horizontally through said airship, fourth to provide a ready means for increasing, decreasing and reversing the operating force of the propellers or helicopters, and fifth, to provide an airship of such a construction that it will operate in the water.

With these and other objects in view, my invention consists of certain novel features of construction, combination and arrangement of parts as will be hereinafter described in detail and particularly set forth in the appended claims, reference being had to the accompanying drawings, and to the characters of reference thereon, which form a part of this specification.

In the drawings, Figure 1 is a side elevational view of my airship complete, Fig. 2 is a longitudinal section thereof, Fig. 3 is a plan view thereof, Fig. 4 is a plan view of the lower portion thereof showing the gas bag by dotted lines, Fig. 5 is a rear end elevational view, Fig. 6 is a transverse sectional view through A—B in Fig. 3, Fig. 7 is a detail view showing the power transmission mechanism connected to the vertical propellers, Fig. 8 is a side elevational view of my reversible blade propeller, Fig. 9 is a sectional view of one of said propellers shown in connection with the supports and operating mechanism and Fig. 10 is a side elevational view of a portion thereof.

Similar characters of reference refer to similar parts throughout the several views.

In the drawings, numeral 1 represents the gas bag, 2 the side planes, 3 the vertical tubes, 4 the vertical propellers, 5 the front propeller, 6 the rear steering propellers, 7 the horizontal tubes, 8 the horizontal propellers, and 9 and 10 the engines.

The gas bag 1 is oval shaped as shown best in Figs. 1, 2 and 3 and is provided with shields 1ᵃ and 1ᵇ at its ends. It is made of material adapted for and filled with hydrogen gas. Through the central portion of the bag 1 is provided a plurality of vertical tubes 3 which extend upwardly through the bag, and the body of the ship. In these tubes are placed propellers 4 which are adapted to operate therein. In the drawings I have shown only one propeller in each tube, but if desired there may be several propellers in each tube, one above the other. These propellers are operated by means of endless cables and shafting connected with engines 9 and 10, through the walls of the tubes 3 as graphically shown in Fig. 7. These propellers 4 are for the purpose of assisting in raising and lowering the machine. The gas bag is of a sufficient capacity to approximately sustain the weight of the machine and its load. The frame below the gas bag is covered with material which adapts it to float in the water. To the gas bag 1 is suspended by proper lashings, a supporting frame which is attached to the pieces 1ᵃ and 1ᵇ at the ends. In the lower part of this frame, on each side, are provided longitudinal tubes 7, in which are placed propellers 8 which are adapted to operate therein. These propellers are for the purpose of assisting in propelling the machine. In the drawings there is shown only one propeller in each tube, but there may be several of these propellers in each tube, if desired, to further facilitate its propelling. These propellers are operated by means of cables in operative connection with said engines 9 and 10. Centrally located in this frame are two engines 9 and 10, which operate in unison. Either one is of sufficient power to operate the propellers, so that in case one becomes disabled, the other will be sufficient to operate the machinery. Upon the front end of the machine mounted on piece 1ᵃ is a propeller 5 which is adapted to force the machine forward or backward as desired. This propeller is operated by means of cables in operative connection with the engines 9 and 10. Between each of the engines 9 and 10 and their cable connections may be provided clutches, so as to allow the operation of one of said engines without the other, and to allow the starting of the mechanism after the engines have acquired sufficient speed. On the rear end of the machine attached to piece 1$^b$ and to the frame near the bottom are provided two propellers with reversible blades. These propellers are for the purpose of turning the machine laterally, and they are constructed as shown best in Figs. 8, 9, and 10. The propeller located near the bottom of the frame is specially adapted for steering the airship in case of operating it on the water. All the propellers are operated by means of endless cables in operative connection with the engines 9 and 10, similar to those shown in Fig. 7, the propellers all being the reversible blade kind as shown in Figs. 8, 9 and 10.

Attached to the piece 1$^b$ and to the frame of the machine respectively are braces 6$^a$ that extend toward the rear and connect with rings 6$^b$ inside of which operate the propellers 6 which are revolubly mounted upon other braces 6$^c$ which extend outwardly, and are provided with shafts 6$^d$, upon which are mounted these propellers. These propellers are preferably composed of four blades 6$^e$. Around the shafts 6$^d$, some distance therefrom, are provided rings 6$^f$ and the propeller blades are pivotally mounted therein, and on the inner ends of said propeller blades are provided cranks 6$^g$ which are pivotally attached to thrust pieces 6$^h$. These thrust pieces are adapted to be thrust endwise on shaft 6$^d$ and thereby rotate the propeller blades as desired. The thrust pieces are operated by means of levers 6$^i$ which connect at their other ends with cables 6$^j$ through pulleys 6$^k$. Said cables extend to the station of the operator of the machine.

Horizontally on each side of the machine and approximately at the middle of the bag are provided side planes 2. Said planes are divided into a plurality of sections 2$^a$ which are pivotally attached to the frames of said planes. These planes are pivoted to the frame at points 2$^b$, and the rear ends are mounted upon segments 2$^c$ which are provided with cables which facilitate the movement of the rear end of the main planes 2, upwardly and downwardly, on said segments, thereby causing the airship to rise or fall as desired. The segments 2$^a$ are provided with rods 2$^d$ running lengthwise with said main planes and pivotally attached to each of the sections 2$^a$. To these rods 2$^d$ are attached links 2$^e$ which are pivotally connected to levers 2$^f$. These levers 2$^f$ are provided on their lower extended ends with levers 2$^g$ upon the ends of which are connected cables 2$^h$ which extend to the station of the operator. By pulling one of the cables 2$^h$, operates lever 2$^f$, thrusting the link 2$^e$ lengthwise which in turn thrusts the rod 2$^d$ endwise and folds the sections over each other, thereby lessening the area of the main planes.

Though I have shown and described a particular, detailed construction, I do not wish to be limited to this particular construction, but desire to include in the purview of my invention the principles substantially as embodied and set forth in the appended claims.

It will be readily seen that with this construction, there is provided an air ship which combines the qualities of the dirigible balloon or gas bag, with the adjustability of the aeroplane, that the propellers operating in tubes provide an additional lifting and sustaining power, that the planes are adjustably adapted to increase or decrease the sustaining area and that the vertical propellers provide further sustaining power without interfering with the machine's forward or backward movements, and that by means of the reversible blades in the steering propellers, the airship may be turned in either direction by simply adjusting the blades of said rear propellers.

Having thus described my invention, what I claim as new and desire to secure by Letters Patent, is:—

1. An airship comprising a gas bag, a frame attached thereto, adjustable side planes one on each side attached to the said frame, a plurality of tubes extending vertically through said bag, and said frame, vertical propellers in said tubes, means for operating said propellers, and reversible propellers on the rear end adapted to change the lateral direction of the machine, all substantially as set forth.

2. An air ship comprising, a gas bag, a frame attached thereto, adjustable side planes attached to each side of said frame, a plurality of tubes extending vertically through said bag and frame, vertical propellers in said tubes, means for operating said propellers, a reversible propeller on the rear end adapted to change the lateral direction of the machine, longitudinal tubes in the frame of said machine, and propellers adapted to operate therein, all substantially as set forth.

3. An air ship comprising, a gas bag, a frame suspended therefrom, adjustable side planes attached one on each side of said frame, a plurality of tubes extending vertically through said bag and frame, propellers in said tubes, a reversible propeller on the rear end of said frame adapted to change the lateral direction of the machine, a plurality of longitudinal tubes in the frame of said machine, propellers adapted to operate therein, and common power means for operating all of said propellers, all substantially as set forth.

4. In an air ship, the combination of a gas bag, vertical tubes extending through said bag, propeller means for propelling said machine forward and backward, adjustable longitudinal planes adapted to guide said machine, vertically, a plurality of reversible propellers comprising pivotally mounted blades and means for rotating said blades, all substantially as set forth.

5. In an air ship, the combination of a gas bag, vertical tubes extending through said bag, propeller means for propelling said machine forward and backward, adjustable longitudinal planes adapted to guide said machine vertically, a steering means comprising a reversible propeller having pivotally mounted blades, means for rotating said blades, and an annular guard around said blades, all substantially as set forth.

6. An air ship comprising, a gas bag, shields on the ends of said gas bag, a frame lashed to said gas bag and attached to said shields, a water-tight covering over the lower portion of said frame, adjustable side planes attached one on each side of said frame, means for folding the sections in said side planes so as to increase or decrease their sustaining areas, a plurality of tubes extending vertically through said airship, propellers in said tubes, reversible propellers on the rear end of said frame, one adapted to shift said machine laterally in the air, and the other adapted to shift said machine laterally in the water, a plurality of longitudinal tubes in said frame, propellers adapted to operate in said tubes and a common means for operating all of said propellers, all substantially as set forth.

In testimony whereof, I have hereunto subscribed my name in the presence of two subscribing witnesses.

JOHN T. LONG.

Witnesses:
ELMER E. RODABAUGH,
ABRAM B. BOWMAN.

Copies of this patent may be obtained for five cents each, by addressing the "Commissioner of Patents, Washington, D. C."